United States Patent [19]
Cooper

[11] Patent Number: 6,152,460
[45] Date of Patent: Nov. 28, 2000

[54] SLIDABLE LOAD CARRYING BASKET

[76] Inventor: Rose Grace Cooper, 65 Mill St., Naugatuck, Conn. 06770

[21] Appl. No.: 09/224,302

[22] Filed: Dec. 31, 1998

[51] Int. Cl.⁷ ....................................................... B62B 9/04
[52] U.S. Cl. ............................................ 280/15; 280/845
[58] Field of Search .............................. 280/33.997, 19.1, 280/8, 9, 14.1, 15, 7.12, 20, 24, 28.13, 28.11, 10, 845

[56] References Cited

U.S. PATENT DOCUMENTS

| | | | |
|---|---|---|---|
| D. 401,529 | 11/1998 | Lippert et al. . | |
| 2,473,076 | 6/1949 | Scheibner | 280/24 |
| 3,464,735 | 9/1969 | Smith | 280/24 |
| 3,779,571 | 12/1973 | Ahmling | 280/19.1 |
| 4,070,030 | 1/1978 | Clark | 280/24 |
| 4,139,208 | 2/1979 | Kaley et al. | 280/9 |
| 4,589,668 | 5/1986 | Mares | 280/8 |
| 4,662,532 | 5/1987 | Anderson et al. . | |
| 4,778,190 | 10/1988 | Meredith | 280/8 X |
| 4,863,075 | 9/1989 | Romer | 280/8 X |
| 5,480,170 | 1/1996 | Kaiser, II . | |

FOREIGN PATENT DOCUMENTS 2603370  5/1988  France .

*Primary Examiner*—Brian L. Johnson
*Assistant Examiner*—Bryan Fishcmann

[57] ABSTRACT

A slidable load carrying basket for receiving a load and sliding along a ground surface. The slidable load carrying basket includes a container with a bottom panel, a front panel that extends upwardly from the bottom panel, a back panel that extends upwardly from the bottom panel, and a pair of side panels that extend between the front and rear panels. The bottom panel of the container has upper and lower surfaces. A pair of elongate spaced apart runners are coupled to the lower surface of the bottom panel. The runners are adapted for sliding along a ground surface.

6 Claims, 3 Drawing Sheets

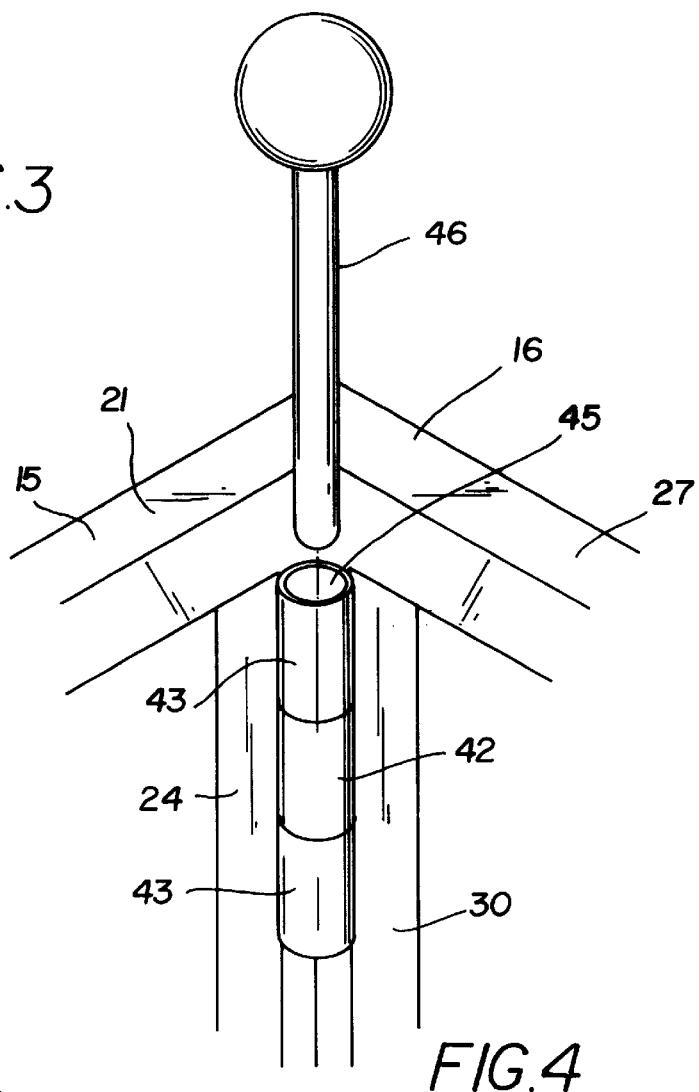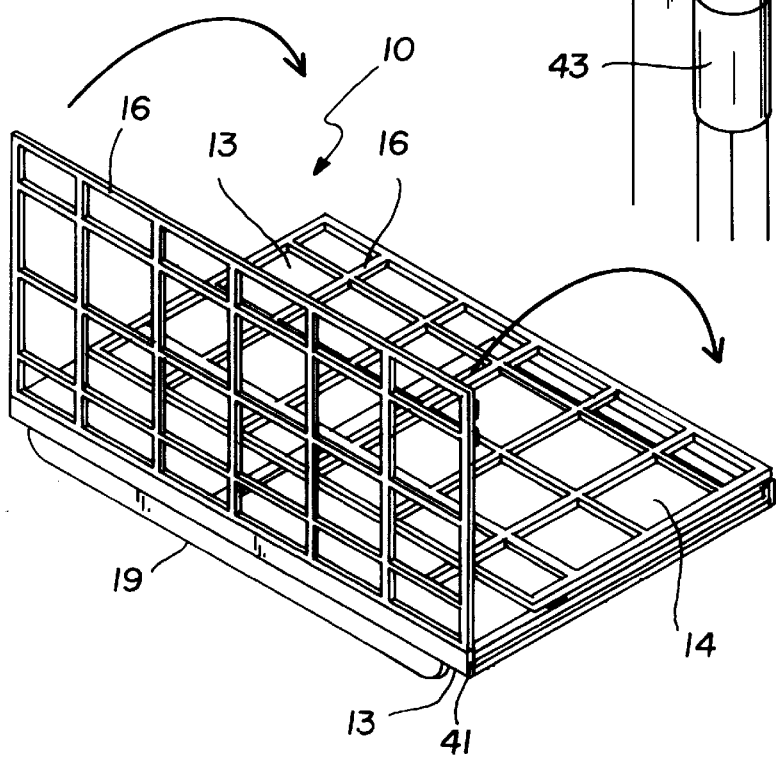

SLIDABLE LOAD CARRYING BASKET

BACKGROUND OF THE INVENTION

1. Field of the Invention

The present invention relates to utility baskets and more particularly pertains to a new slidable load carrying basket for receiving a load and sliding along a ground surface.

2. Description of the Prior Art

The use of utility baskets is known in the prior art. More specifically, utility baskets heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 5,671,933; U.S. Pat. No. 4,194,654; U.S. Pat. No. 3,866,932; U.S. Pat. No. 5,180,178; U.S. Pat. No. 2,478,678; and U.S. Pat. No. Des. 348,128.

While these devices fulfill their respective, particular objectives and requirements, the aforementioned patents do not disclose a new slidable load carrying basket. The inventive device includes a container with a bottom panel, a front panel that extends upwardly from the bottom panel, a back panel that extends upwardly from the bottom panel, and a pair of side panels that extend between the front and rear panels. The bottom panel of the container has upper and lower surfaces. A pair of elongate spaced apart runners are coupled to the lower surface of the bottom panel. The runners are adapted for sliding along a ground surface.

In these respects, the slidable load carrying basket according to the present invention substantially departs from the conventional concepts and designs of the prior art, and in so doing provides an apparatus primarily developed for the purpose of receiving a load and sliding along a ground surface.

SUMMARY OF THE INVENTION

In view of the foregoing disadvantages inherent in the known types of utility baskets now present in the prior art, the present invention provides a new slidable load carrying basket construction wherein the same can be utilized for receiving a load and sliding along a ground surface.

The general purpose of the present invention, which will be described subsequently in greater detail, is to provide a new slidable load carrying basket apparatus and method which has many of the advantages of the utility baskets mentioned heretofore and many novel features that result in a new slidable load carrying basket which is not anticipated, rendered obvious, suggested, or even implied by any of the prior art utility baskets, either alone or in any combination thereof.

To attain this, the present invention generally comprises a container with a bottom panel, a front panel that extends upwardly from the bottom panel, a back panel that extends upwardly from the bottom panel, and a pair of side panels that extend between the front and rear panels. The bottom panel of the container has upper and lower surfaces. A pair of elongate spaced apart runners are coupled to the lower surface of the bottom panel. The runners are adapted for sliding along a ground surface.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new slidable load carrying basket apparatus and method which has many of the advantages of the utility baskets mentioned heretofore and many novel features that result in a new slidable load carrying basket which is not anticipated, rendered obvious, suggested, or even implied by any of the prior art utility baskets, either alone or in any combination thereof.

It is another object of the present invention to provide a new slidable load carrying basket which may be easily and efficiently manufactured and marketed.

It is a further object of the present invention to provide a new slidable load carrying basket which is of a durable and reliable construction.

An even further object of the present invention is to provide a new slidable load carrying basket which is susceptible of a low cost of manufacture with regard to both materials and labor, and which accordingly is then susceptible of low prices of sale to the consuming public, thereby making such slidable load carrying basket economically available to the buying public.

Still yet another object of the present invention is to provide a new slidable load carrying basket which provides in the apparatuses and methods of the prior art some of the advantages thereof, while simultaneously overcoming some of the disadvantages normally associated therewith.

Still another object of the present invention is to provide a new slidable load carrying basket for receiving a load and sliding along a ground surface.

Yet another object of the present invention is to provide a new slidable load carrying basket which includes a container with a bottom panel, a front panel that extends upwardly from the bottom panel, a back panel that extends upwardly from the bottom panel, and a pair of side panels that extend between the front and rear panels. The bottom panel of the container has upper and lower surfaces. A pair of elongate spaced apart runners are coupled to the lower surface of the bottom panel. The runners are adapted for sliding along a ground surface.

Still yet another object of the present invention is to provide a new slidable load carrying basket that permits physically challenged individuals and people with limited mobility to move items with less exertion than carrying the items.

Even still another object of the present invention is to provide a new slidable load carrying basket that overcomes the disadvantages of wheels not rolling well over grass, gravel, and other uneven terrain.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a schematic perspective view of an alternate embodiment of the present invention.

FIG. 4 is a schematic perspective view of an alternate embodiment of the present invention.

DESCRIPTION OF THE PREFERRED EMBODIMENT

Figures 1, 2:
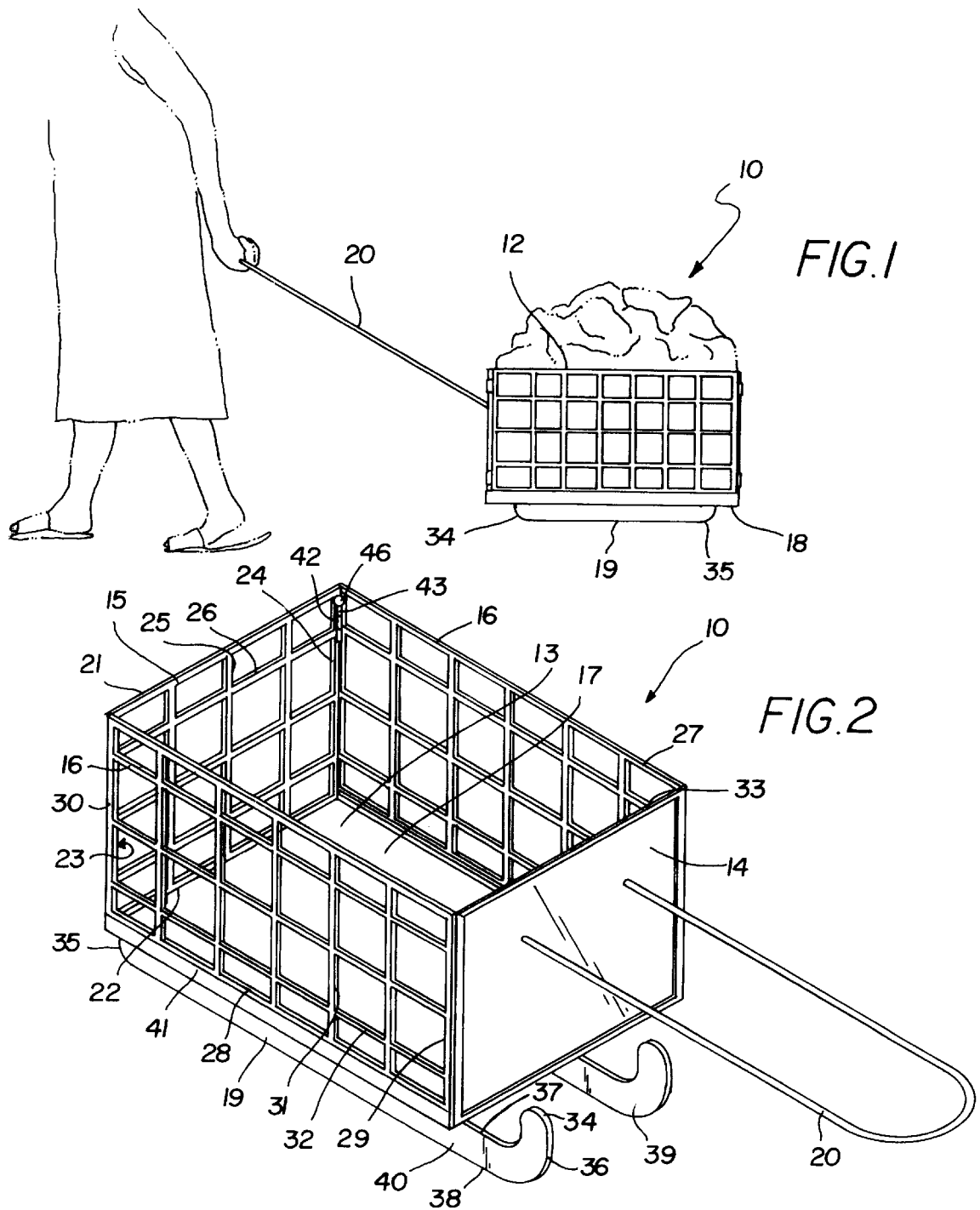
FIG. 1 is a schematic side view of a new slidable load carrying basket according to the present invention.
FIG. 2 is a schematic perspective view of the present invention.
Figure 5:
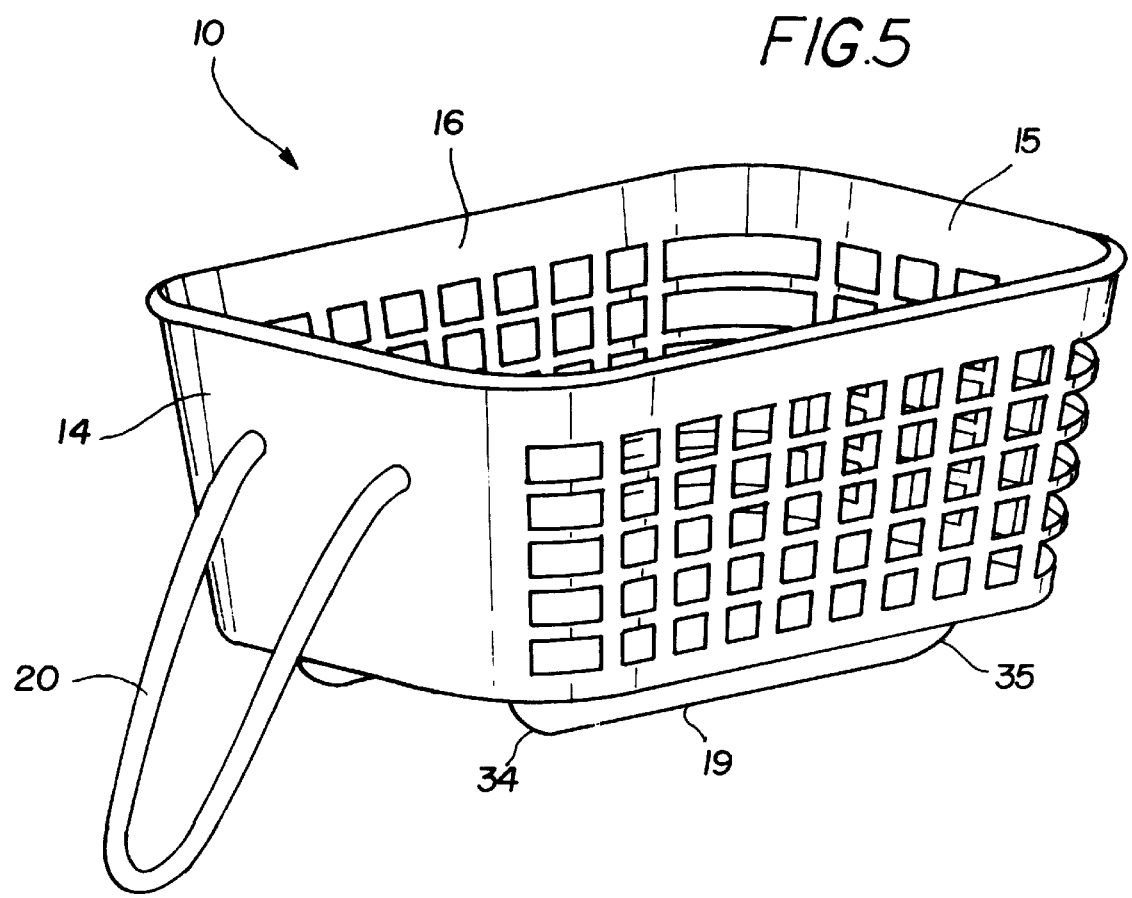
FIG. 5 is a schematic perspective view of the present invention.

With reference now to the drawings, and in particular to FIGS. 1 through 5 thereof, a new slidable load carrying basket embodying the principles and concepts of the present invention and generally designated by the reference numeral 10 will be described.

As best illustrated in FIGS. 1 through 5, the slidable load carrying basket 10 generally comprises a container 12 with a bottom panel 13, a front panel 14 that extends upwardly from the bottom panel, a back panel 15 that extends upwardly from the bottom panel, and a pair of side panels 16 that extend between the front and rear panels. The bottom panel of the container has upper and lower surfaces 17,18. A pair of elongate spaced apart runners 19 are coupled to the lower surface of the bottom panel. The runners are adapted for sliding along a ground surface.

Preferably, the container has a solid generally rectangular bottom panel, a solid generally rectangular front panel extending upwardly from the bottom panel, a grid-like back panel extending upwardly from the bottom panel, and a pair of grid-like side panels extending between the front and rear panels. The front panel is solid for strength. When being pulled by the line 20, as discussed below.

Ideally, the front and rear panels of the container are oriented substantially perpendicular to the bottom panel of the container. The side panels of the container are oriented substantially perpendicular to the bottom panel of the container.

Preferably, the rear panel of the container has opposite upper and lower cross members 21,22 and opposite first and second cross members 23,24 that extend between the upper and lower cross members of the rear panel. The lower cross member is positioned towards the bottom panel of the container. The rear panel has a plurality of vertical members 25 that extend between the upper and lower cross members of the rear panel of the container. Also preferably, the rear panel has a plurality of horizontal members 26 that extend between the first and second cross members of the rear panel of the container. If the horizontal and vertical members are used together, the horizontal members intersect the vertical members of the rear panel. In such an embodiment, the horizontal members and the vertical members of the rear panel defining a plurality of apertures.

Preferably, each of the side panels of the container has opposite upper and lower cross members 27,28 and opposite forward and rear cross members 29,30 that extend between the upper and lower cross members of the side panels. The lower cross members are positioned towards the bottom panel of the container. Each of the side panels has a plurality of vertical members 31 that extend between the upper and lower cross members of the side panels of the container. Also preferably, each of the side panels has a plurality of horizontal members 32 that extend between the forward and rear cross members of the side panels of the container. If the horizontal and vertical members are used together, the horizontal members intersect the vertical members. The horizontal members and the vertical members of each of the side panels define a plurality of apertures.

Ideally, the upper cross members of the rear and side panels and an upper edge 33 of the front panel lie on a common plane.

Each of the runners has opposite front and rear ends 34,35 and a longitudinal axis that extend between the ends of the runners. Preferably, the longitudinal axes of the runners are oriented substantially perpendicular to each other.

Preferably, as shown in FIG. 1, the front end of each of the runners curves towards the bottom panel to help the runner slide over protrusions that extend from the ground surface. Optionally, the rear end of each of the runners may curve towards the bottom panel.

Alternatively, as shown in FIG. 2, each of the runners has an upwardly curving front portion 36 that is positioned towards the front end of the runner and is adapted for helping the runner slide over protrusions that extend from the ground surface. Also preferably, the front end of each of the runners is rounded. Optionally, the rear end of each of the runners may also be rounded.

Preferably, a flexible line is coupled to the front panel of the container. The line is adapted for permitting a user to pull the container. Ideally, the front panel of the container has a pair of holes that extend through it. Free ends of the line extend through the holes of the front panel of the container.

A length of the container is defined between the front and back panels of the container. The preferred length of the container is between about 12 and 36 inches, ideally about 23 inches.

A width of the container is defined between the side panels of the container. The preferred width of the container is between about 8 and 28 inches, ideally about 16 inches.

A height of the container is defined between the upper and lower cross members of the side panels of the container. The preferred height of the container is between about 6 and 18 inches, ideally about 12 inches.

Ideally, each of the runners has a generally rectangular transverse cross section taken perpendicular to the longitudinal axis of the runners. Each of the runners has upper and lower edges 37,38 and inner and outer sides 39,40. A width of each of the runners is defined between its inner and outer sides. The preferred width of each of the runners is about ½ inch.

In an alternate embodiment, the bottom panel of the container has a pair of lips 41 that extend upwardly from opposite side edges of the bottom panel. The front panel is pivotally coupled to the bottom panel. The back panel is pivotally coupled to the bottom panel. Each of the side panels is pivotally coupled to the lips of the bottom panel. The front, rear and side panels may have similar structure and shapes as described above in the description of the primary embodiment.

The front and rear panels of the container are positionable between a deployed position and a retracted position. The front and rear panels are oriented substantially perpendicular to the bottom panel of the container when in the deployed position. The front and rear panels rest on the bottom panel of the container when in the retracted position.

The side panels of the container are also positionable between a deployed position and a retracted position. The side panels are oriented substantially perpendicular to the bottom panel of the container when in the deployed position. The lips elevate the lower edges of the side panels such that the side panels rest on the front and rear panels of the container when in the retracted position.

Preferably, each of the first and second cross members of the rear panel has a holed flange 42 that extend inwardly therefrom and positioned towards the upper cross member thereof. Each of the forward and rear cross members of the side panels has a pair of holed flanges 43 that extend inwardly therefrom and positioned towards the upper cross member thereof. The front panel has opposed side edges. Each of the side edges of the front panel has a holed flange (not shown) that extend inwardly therefrom. The holed flange of the front panel is like the holed flange of the rear panel.

Each of the holed flanges has a bore 45 therethrough. The bores of the holed flanges of the rear cross members of side panels are alignable with the bores of the holed flanges of the rear panel. The bores of the holed flanges of the forward cross members of the side panels are alignable with the bores of the holed flanges of the front panel. A plurality of pins 46 are insertable in the bores of the holed flanges.

Also preferably, the upper cross members of the rear and side panels and an upper edge of the front panel lie on a common plane when the front, rear, and side panels are in the deployed position.

In use, a load is placed in the container. The line is grasped and pulled to pull the container along a ground surface. The runners slide along the ground surface. In this way, a physically challenged user does not have to carry the load between two points, but rather can slide it between the points. In an exemplary use, wet clothing is removed from a washing machine and placed in the container. The container is slid along the ground surface towards a clothes line.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A slidable load carrying device, comprising:

container having a bottom panel, a front panel extending upwardly from said bottom panel, a rear panel extending upwardly from said bottom panel, and a pair of side panels extending between said front and rear panels;

said front panel of said container being substantially solid and having a pair of holes extending therethrough;

said bottom panel of said container having upper and lower surfaces;

a pair of elongate spaced apart runners being coupled to said lower surface of said bottom panel, said runners being adapted for sliding along a ground surface;

said front and rear panels of said container being oriented substantially perpendicular to said bottom panel of said container, said side panels of said container being oriented substantially perpendicular to said bottom panel of said container;

said rear panel of said container having opposite upper and lower cross members and opposite first and second cross members extending between said upper and lower cross members of said rear panel, said lower cross member being positioned towards said bottom panel of said container, said rear panel having a plurality of vertical members extending between said upper and lower cross members of said rear panel of said container;

said rear panel having a plurality of horizontal members extending between said first and second cross members of said rear panel of said container;

each of said side panels having a plurality of vertical members extending between said upper and lower cross members of said side panels of said container;

each of said side panels having a plurality of horizontal members extending between said forward and rear cross members of said side panels of said container;

said upper cross members of said rear and side panels and an upper edge of said front panel lie on a common plane;

each of said runners having opposite front and rear ends and a longitudinal axis extending between said ends of said runners, each of said runners having an upwardly curving front portion being positioned towards said front end of said runner and being adapted for helping said runner slide over protrusions extending from the ground surface, said front end of each of said runners being rounded, said rear end of each of said runners being rounded, said front end of each of said runners curving towards said bottom panel, said rear end of each of said runners curving towards said bottom panel;

said front panel of said container being pivotally coupled to said bottom panel, said back panel being pivotally coupled to said bottom panel, said side panels being pivotally coupled to said bottom panel; and said front and rear panels of said container being positionable between a deployed position and a retracted position, said front and rear panels being oriented generally perpendicular to said bottom panel of said container when in said deployed position, said front and rear panels being oriented generally parallel said bottom panel of said container when in said retracted position, said side panels of said container being positionable between a deployed position and a retracted position, said side panels being oriented substantially perpendicular to said bottom panel of said container when in said deployed position, said side panels being oriented generally parallel said bottom panel of said container when in said retracted position.

2. The slidable load carrying device of claim 1, further comprising a line being coupled to said front panel of said container, said line being adapted for permitting a user to pull said container, free ends of said line extending through said holes of said front panel of said container.

3. The slidable load carrying device of claim 1, wherein outer ends of said rear panel each have a holed flange extending inwardly therefrom, outer ends of side panels each having a pair of holed flanges extending inwardly therefrom, said front panel having opposed side edges, each of said side edges of said front panel having a holed flange extending inwardly therefrom, each of said holed flanges having a bore therethrough, said bores of said holed flanges of said rear cross members of side panels being alignable with said bores of said holed flanges of said rear panel, said bores of said holed flanges of said forward cross members of side panels being alignable with said bores of said holed flanges of said front panel, a plurality of pins being insertable in said bores of said holed flanges.

4. The slidable load carrying device of claim 1, wherein said upper cross members of said rear and side panels and an upper edge of said front panel lie on a common plane when said front, rear, and side panels are in said deployed position.

5. A slidable load carrying device, comprising:

a container having a solid generally rectangular bottom panel, a solid generally rectangular front panel extending upwardly from said bottom panel, a rear panel extending upwardly from said bottom panel, and a pair of side panels extending between said front and rear panels;

said front and rear panels of said container being oriented substantially perpendicular to said bottom panel of said container;

said side panels of said container being oriented substantially perpendicular to said bottom panel of said container;

said rear panel of said container having opposite upper and lower cross members and opposite first and second cross members extending between said upper and lower cross members of said rear panel, said lower cross member being positioned towards said bottom panel of said container;

said rear panel having a plurality of vertical members extending between said upper and lower cross members of said rear panel of said container;

said rear panel having a plurality of horizontal members extending between said first and second cross members of said rear panel of said container and intersecting said vertical members of said rear panel;

said horizontal members and said vertical members of said rear panel defining a plurality of apertures;

each of said side panels of said container having opposite upper and lower cross members and opposite forward and rear cross members extending between said upper and lower cross members of said side panels, said lower cross members being positioned towards said bottom panel of said container;

each of said side panels having a plurality of vertical members extending between said upper and lower cross members of said side panels of said container;

each of said side panels having a plurality of horizontal members extending between said forward and rear cross members of said side panels of said container and intersecting said vertical members of said side panels;

said horizontal members and said vertical members of each of said side panels defining a plurality of apertures;

wherein said upper cross members of said rear and side panels and an upper edge of said front panel lie on a common plane;

said bottom panel of said container having upper and lower surfaces;

a pair of elongate spaced apart runners being coupled to said lower surface of said bottom panel, said runners being adapted for sliding along a ground surface;

each of said runners having opposite front and rear ends and a longitudinal axis extending between said ends of said runners;

said longitudinal axes of said runners being oriented substantially parallel to each other;

said front end of each of said runners curving towards said bottom panel;

said rear end of each of said runners curving towards said bottom panel;

each of said runners having a generally rectangular transverse cross section taken perpendicular to said longitudinal axis of said runners;

said front panel of said container having a pair of holes extending therethrough;

a line having opposite free ends, said free ends of said line extending through said holes of said front panel of said container, said line being adapted for permitting a user to pull said container;

said front panel of said container being pivotally coupled to said bottom panel, said back panel being pivotally coupled to said bottom panel, said side panels being pivotally coupled to said bottom panel;

said front and rear panels of said container being positionable between a deployed position and a retracted position, said front and rear panels being oriented generally perpendicular to said bottom panel of said container when in said deployed position, said front and rear panels being oriented generally parallel said bottom panel of said container when in said retracted position, said side panels of said container being positionable between a deployed position and a retracted position, said side panels being oriented substantially perpendicular to said bottom panel of said container when in said deployed position, said side panels being oriented generally parallel said bottom panel of said container when in said retracted position;

a length of said container being defined between said front and back panels of said container, wherein said length of said container is between about 12 and 36 inches;

a width of said container being defined between said side panels of said container, wherein said width of said container is between about 8 and 28 inches;

a height of said container being defined between said upper and lower cross members of said side panels of said container, wherein said height of said container is between about 6 and 18 inches;

each of said runners having upper and lower edges and inner and outer sides; and a width of each of said runners being defined between said inner and outer sides thereof, wherein said width of each of said runners is about ½ inch.

6. A slidable load carrying device, comprising:

a container having a solid generally rectangular bottom panel;

said bottom panel of said container having a pair of lips extending upwardly from opposite side edges thereof;

said container having a solid generally rectangular front panel being pivotally coupled to said bottom panel, a rear panel being pivotally coupled to said bottom panel, and a pair of side panels being pivotally coupled to said lips of said bottom panel;

said front and rear panels of said container being positionable between a deployed position and a retracted position, said front and rear panels being oriented substantially perpendicular to said bottom panel of said container when in said deployed position, said front and rear panels resting on said bottom panel of said container when in said retracted position;

said side panels of said container being positionable between a deployed position and a retracted position, said side panels being oriented substantially perpendicular to said bottom panel of said container when in said deployed position, said side panels resting on said front and rear panels of said container when in said retracted position;

said rear panel of said container having opposite upper and lower cross members and opposite first and second cross members extending between said upper and lower cross members of said rear panel, said lower cross member being positioned towards said bottom panel of said container;

said rear panel having a plurality of vertical members extending between said upper and lower cross members of said rear panel of said container;

said rear panel having a plurality of horizontal members extending between said first and second cross members of said rear panel of said container and intersecting said vertical members of said rear panel;

said horizontal members and said vertical members of said rear panel defining a plurality of apertures;

each of said side panels of said container having opposite upper and lower cross members and opposite forward and rear cross members extending between said upper and lower cross members of said side panels;

each of said side panels having a plurality of vertical members extending between said upper and lower cross members of said side panels of said container;

each of said side panels having a plurality of horizontal members extending between said forward and rear cross members of said side panels of said container and intersecting said vertical members of said side panels;

said horizontal members and said vertical members of each of said side panels defining a plurality of apertures;

each of said first and second cross members of said rear panel having a holed flange extending inwardly therefrom and positioned towards said upper cross member thereof, each of said holed flanges having a bore therethrough;

each of said forward and rear cross members of said side panels having a pair of holed flanges extending inwardly therefrom and positioned towards said upper cross member thereof, each of said holed flanges having a bore therethrough;

said front panel having opposed side edges, each of said side edges of said front panel having a holed flange extending inwardly therefrom, each of said holed flanges having a bore therethrough;

said bores of said holed flanges of said rear cross members of side panels being alignable with said bores of said holed flanges of said rear panel, said bores of said holed flanges of said forward cross members of side panels being alignable with said bores of said holed flanges of said front panel;

a plurality of pins being insertable in said bores of said holed flanges;

wherein said upper cross members of said rear and side panels and an upper edge of said front panel lie on a common plane when said front, rear, and side panels are in said deployed position;

said bottom panel of said container having upper and lower surfaces;

a pair of elongate spaced apart runners being coupled to said lower surface of said bottom panel, said runners being adapted for sliding along a ground surface;

each of said runners having opposite front and rear ends and a longitudinal axis extending between said ends of said runners;

said longitudinal axes of said runners being oriented substantially parallel to each other;

said front end of each of said runners curving towards said bottom panel;

said rear end of each of said runners curving towards said bottom panel;

each of said runners having a generally rectangular transverse cross section taken perpendicular to said longitudinal axis of said runners;

said front panel of said container having a pair of holes extending therethrough;

a line having opposite free ends, said free ends of said line extending through said holes of said front panel of said container, said line being adapted for permitting a user to pull said container;

a length of said container being defined between said front and back panels of said container, wherein said length of said container is between about 12 and 36 inches;

a width of said container being defined between said side panels of said container, wherein said width of said container is between about 8 and 28 inches;

a height of said container being defined between said upper and lower cross members of said side panels of said container, wherein said height of said container is between about 6 and 18 inches;

each of said runners having upper and lower edges and inner and outer sides; and a width of each of said runners being defined between said inner and outer sides thereof, wherein said width of each of said runners is about __½__ inch.

* * * * *